Feb. 24, 1953
H. SUTHERLAND
2,629,491
APPARATUS FOR WINNOWING TEA
Filed Aug. 5, 1947
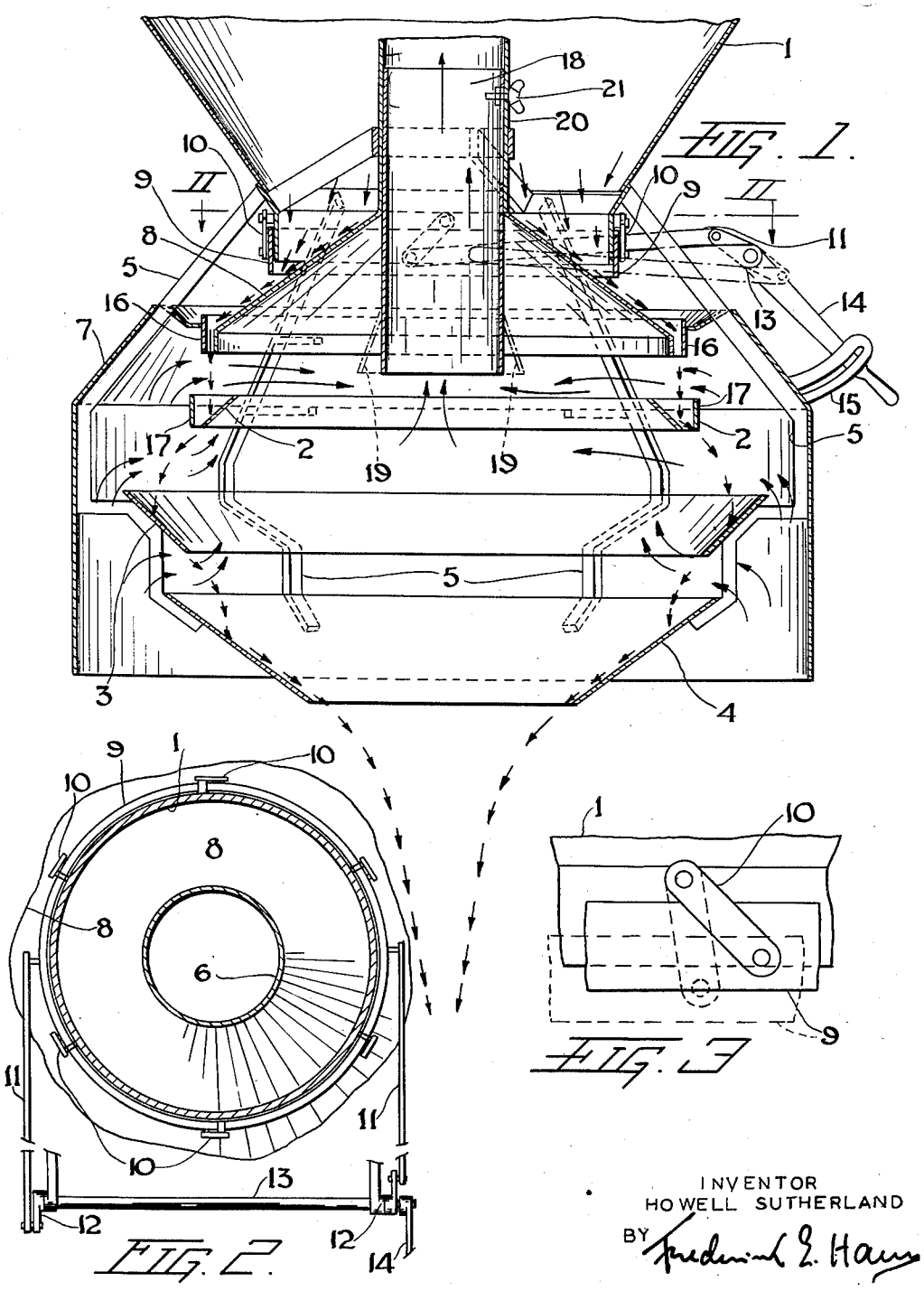
INVENTOR
HOWELL SUTHERLAND
BY *Frederick E. Hays*
ATTORNEY

UNITED STATES PATENT OFFICE 2,629,491

APPARATUS FOR WINNOWING TEA

Howell Sutherland, Durban, Natal, Union of South Africa, assignor to J. Lyons & Company Limited, London, England Application August 5, 1947, Serial No. 766,191
In Great Britain June 11, 1945

Section 1, Public Law 690, August 8, 1946
Patent expires June 11, 1965

6 Claims. (Cl. 209—136)

This invention relates to an apparatus for winnowing tea.

A tea winnowing apparatus according to the invention, comprises, a plurality of sloping baffles arranged one below the other in vertically spaced relationship, means for feeding a continuous stream of tea onto the topmost baffle, so that it falls in a series of cascades from one baffle to the next below it, and means for causing air to pass through the several curtains of cascading tea so that dust and fine particles are thereby removed by said air.

More particularly the baffles are arranged in the form of a hollow substantially box-like frame and the air currents are arranged to be drawn through the curtains of cascading tea in an inward and upward direction. To achieve this result, a suction conduit from air exhausting means, is arranged to communicate with the interior of said box-like frame adjacent the top end thereof. Preferably the baffles are circular and they are arranged concentrically, one below the other, so that the several curtains of falling tea are each of closed annular formation.

The baffles are preferably in the form of hollow, shallow frusto-conical sections, so arranged that the interior space is entirely enclosed by the curtains of cascading tea. To achieve this result, the last or lowest baffle or baffles, is or are inverted to direct the cascading tea inwardly, and the lower end of the lowermost baffle forms an unobstructed discharge opening so that tea converges to form a single concentrated stream, as it leaves the apparatus.

The said baffles are surrounded in spaced relationship by a protective hood, which is open as regards its bottom end to allow the entry of the air for cleaning purposes. The hood also serves to prevent external air currents from disturbing the winnowing effect caused by the induced air current passing through the curtains of falling cascading tea.

The tea to be winnowed is fed to the apparatus from an elevated hopper, and means associated therewith are provided for the purpose of adjusting the rate of feed to suit different operating conditions.

According to a preferred construction of apparatus for carrying out the invention, a feed hopper for the tea to be winnowed, is of cylindrical form and surrounds at least the lower end of a vertical air suction conduit connected to suitable air exhausting means. The said lower end of the air suction conduit, which is concentrically disposed within the feed hopper, is flared and said flared end co-acts with the bottom end of the feed hopper or an extension thereof, for purposes of regulating the flow of tea passing from the feed hopper to the baffles which are arranged one above the other, directly below and concentrically with respect to said feed hopper. The said baffles are so arranged that one or two of the topmost of the series is or are arranged to cause the tea to cascade in an outward direction, while those towards the lower end of the apparatus, are so arranged that the tea is caused to cascade inwardly, until the last or lowest baffle forming an unobstructed discharge opening causes the tea to converge to form a concentrated stream. The feed is so arranged that the space within the baffles is entirely enclosed by the cascading tea, so that the suction effect of the air suction conduit, causes air to be drawn through the cascading tea in an inward and upward direction. The feed is controlled by a movable ring-like feed control member surrounding the lower end of the feed hopper and co-acting as regards its bottom end, with the aforesaid flared bottom end of the suction conduit. This feed control ring is arranged to be raised and lowered by simple lever means, so as to vary the distance between its lower end or edge and the top surface of said suction conduit flaring. This feed control ring is suspended from the bottom of the hopper, by means of a plurality of pivoted links and adjustment is effected by causing said control ring to be pivotally rotated, whereby rotation in one direction causes said ring to rise and increase the feed while rotation in the opposite direction, to a limited extent, causes said ring to be dropped and thereby to restrict the flow of tea passing from the feed hopper. Simple lever and link means are provided for rotating the feed control ring in the direction required.

It will be understood from the aforegoing description that the tea, as it falls from one baffle to the other, is caused to bounce and thereby change direction suddenly. This bouncing effect has the added advantage that it tends to dislodge from the particles of tea, any adhering dirt or extraneous matter, which is thereafter removed by the air currents passing through the cascading tea. The apparatus is of simple construction and is conveniently made from sheet metal.

To enable the invention to be more clearly understood and carried into practice, reference is now made to the accompanying drawing, in which like reference numerals refer to like parts throughout the several views.

In the drawing:

Fig. 1 is a vertical sectional view of a tea winnowing apparatus constructed according to the invention, and Fig. 2 is a fragmentary sectional plan view taken on line II—II of Fig. 1; and Fig. 3 is a fragmentary elevation to an enlarged scale showing the suspension of the feed control ring from the feed hopper.

Referring to the drawing, reference 1 denotes the lower end of the cylindrical feed hopper, which is mounted above and concentrically with respect to the three vertically spaced annular baffles 2, 3 and 4, which are held in position by the frame members 5. These baffles, which are preferably made of sheet metal, are of hollow frusto-conical shape, with the baffle 2 arranged outwardly and downwardly and the two lower ones arranged inwardly and downwardly so as to direct the flow of tea inwardly as clearly shown in Fig. 1, in which the downwardly directed arrows indicate the flow of tea, while the upwardly directed arrows indicate the paths of the air through the curtains of cascading tea and up into a vertical suction conduit 6. This hood serves to prevent external air currents from varying the velocities of air through the curtains of tea and to restrict the volume of air acted upon by conduit 6. A sheet metal hood 7, open as regards its bottom end, surrounds the series of baffles.

The conduit 6, which is concentric with the feed hopper 1, is provided with a flaring 8 at its bottom end. This flaring forms the uppermost outwardly and downwardly directed baffle. The bottom end of the feed hopper 1 extends to within a short distance of its top side so as to leave an annular discharge opening for the tea. Control of the size of this opening is effected by means of the control ring 9, which surrounds and is suspended from the bottom end of the hopper 1 by means of a plurality of pivotally connected links 10. Adjustment of the distance of the bottom edge of the control ring 9 from the flaring 8 is effected by partial rotation of said ring by means of the two connecting links 11, lever arms 12, control shaft 13 and the feed control hand lever 14, which is associated with a slotted quadrant plate 15 for fixing purposes. In Fig. 3 the full line position shows the control ring 9 partly raised, while the broken line outline shows said ring in its substantially closed position.

A guide ring 16 is provided to direct the flow of tea from the baffle 8 onto the next baffle 2, and a similar guide ring 17 is provided to direct the flow from the baffle 2 onto the third baffle 3.

The suction conduit includes an adjustable extension pipe 18 which is fitted in the lower end of the suction conduit 6. The suction conduit or more specifically the extension pipe thereof protrudes through the feed hopper 1 and the uppermost baffle, coaxially therewith, and ends below the lower rim of baffle 8. Said pipe 18 can be raised or lowered to alter the position of the air intake to vary the distribution of air passing through the cascading material. The upper end of said pipe 18 is adjustably secured inside the conduit 6 by means of a bolt 21 passing through a hole in the conduit and a longitudinal slot 20 in the pipe 18. If desired, the lower end of the pipe 18 may be flared as shown at 19 by dotted lines.

Having now particularly described and ascertained the nature of my said invention and in what manner the same is to be performed, I declare that what I claim is:

1. An apparatus for winnowing tea comprising a feed hopper, four frusto-conical baffles mounted in vertical arrangement beneath said feed hopper, one above the other, spaced apart, the upper two of said baffles being downwardly and outwardly directed and the lower two baffles being downwardly and inwardly directed for forming a concentrated stream of winnowed tea leaving the apparatus, the lowermost baffle forming an unobstructed discharge opening a protective hood disposed in close proximity to the spaces between the baffles and open at its lower end for the entry of air into the apparatus, a suction pipe for sucking air through the spaces between the baffles, the said suction pipe projecting through the feed hopper and the uppermost baffle and extending below the lower rim of the said baffle, and an axially adjustable extension pipe fitting in the lower end of the suction pipe for raising and lowering the position of the level of the air intake of the extension pipe, thereby varying the distribution of air passing through the tea cascading from baffle to baffle, the diameter of the intake opening of said extension pipe being small relative to the maximum diameter of the uppermost baffle.

2. An apparatus for winnowing tea comprising in combination a plurality of frusto-conical baffles mounted in vertical arrangement, one above the other, spaced apart, the uppermost baffle being outwardly and downwardly slanted and the lowermost baffle being downwardly and inwardly slanted, a feed hopper mounted above the uppermost baffle for feeding tea to be winnowed to said baffle, the lower rim of the lowermost baffle forming an unobstructed discharge opening for the winnowed out tea, and a suction pipe for sucking air through spaces between the baffles projecting through the feed hopper and the uppermost baffle and extending below the lower rim of the said baffle, the said suction pipe being mounted axially adjustable for raising and lowering the position of the intake opening of the suction pipe relative to the spaces between the baffles, thereby varying the distribution of air passing through the tea cascading from baffle to baffle.

3. A winnowing apparatus according to claim 2, in combination with an axially adjustable extension pipe fitted in the lower end of the suction pipe for varying the level of the intake opening through which air is sucked.

4. A winnowing apparatus according to claim 2, wherein locking means are provided for securing the said suction pipe in a selected axial position.

5. A winnowing apparatus according to claim 1, wherein axially elongated guide rings encompass the peripheral lower edges of the two uppermost baffles radially spaced therefrom, each of said guide rings forming an axial annular guide channel with the respective baffle.

6. An apparatus for winnowing tea comprising in combination a plurality of frusto-conical baffles mounted in vertical arrangement, one above the other, spaced apart, the uppermost baffle being outwardly and downwardly slanted and the lowermost baffle being downwardly and inwardly slanted, a feed hopper mounted above the uppermost baffle for feeding tea to be winnowed to said baffle, the lower rim of the lowermost baffle forming an unobstructed discharge opening for the winnowed out tea, a suction pipe for sucking air through the spaces between the baffles projecting through the feed hopper and the uppermost baffle, coaxially therewith, and extending below the lower rim of the said baffle, the said suction pipe being mounted axially adjustable for raising and lowering the position of the intake opening of the pipe relative to the spaces between the baffles, thereby varying the distribution of air passing through tea cascading from baffle to baffle, and a protective hood disposed in close proximity to the spaces between the baffles and open at its lower end for the entry of air into the apparatus.

HOWELL SUTHERLAND.

REFERENCES CITED

The following references are of record in the file of this patent:

UNITED STATES PATENTS

| Number | Name | Date |
|---|---|---|
| 82,431 | Mills et al. | Sept. 22, 1868 |
| 263,472 | Brown | Aug. 29, 1882 |
| 465,544 | Shelley | Dec. 22, 1891 |
| 884,551 | Wright | Apr. 14, 1908 |
| 1,470,892 | Sturtevant | Oct. 16, 1923 |
| 1,499,724 | Fraser | July 1, 1924 |

FOREIGN PATENTS

| Number | Country | Date |
|---|---|---|
| 340,843 | Germany | Sept. 19, 1921 |
| 342,116 | Germany | Oct. 13, 1921 |
| 661,037 | Germany | June 9, 1938 |